W. R. Greenleaf,
Oil Pump.
N° 47,011. Patented Mar. 28, 1865.
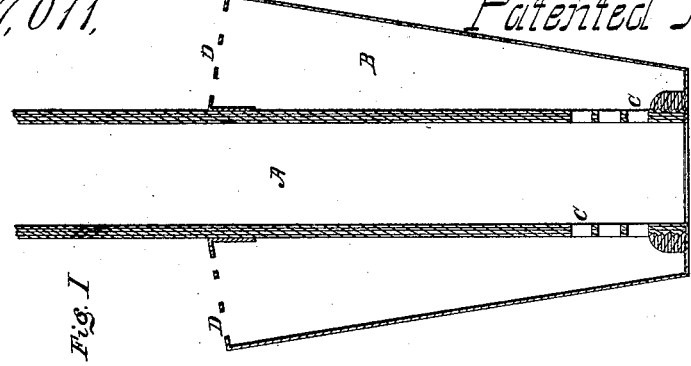
Fig. I
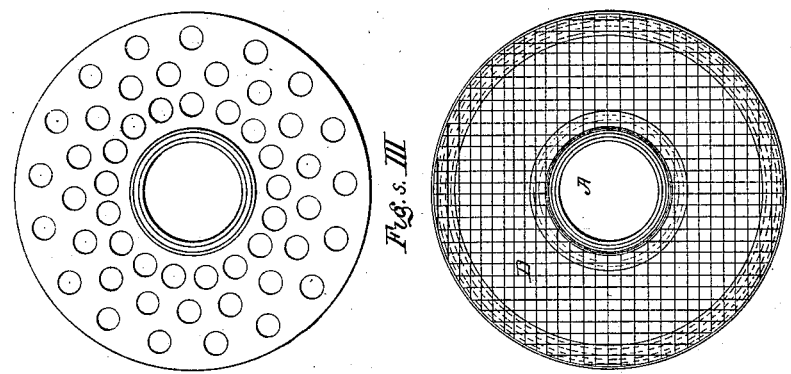
Fig.s III
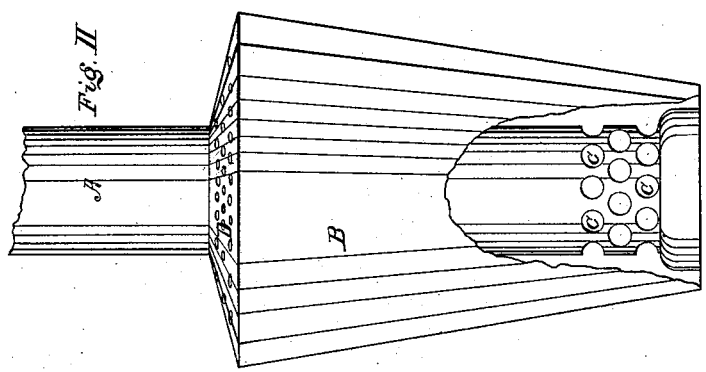
Fig. II
Witnesses
W. H. Forbush
B. H. Muchli
Inventor
W. R. Greenleaf

UNITED STATES PATENT OFFICE.

WILLIAM R. GREENLEAF, OF BUFFALO, NEW YORK.

IMPROVEMENT IN OIL-EJECTORS.

Specification forming part of Letters Patent No. 47,011, dated March 28, 1865.

*To all whom it may concern:*

Be it known that I, WILLIAM R. GREENLEAF, of the city of Buffalo, county of Erie, and State of New York, have invented a certain new and Improved Device for Separating Gas from Oil or Other Liquids; and I do hereby declare that the following is a full, clear, and exact description of the construction and operation thereof, reference being had to the accompanying drawings, making a part of this specification, in which—

Figure I is a vertical section of my improved device. Fig. II is an elevation, and Fig. III is a sectional plan, of same.

The nature of this invention consists in the application of a device to the induction-pipe of a pump, ejector, or other instrument used for raising liquids from Artesian or other wells or reservoirs, by which the gas confined or held in said liquid is separated therefrom and prevented from entering said induction-pipe through the action of the excess of the specific gravity of the liquid over that of the gas.

Letters of like name and kind refer to like parts in each of the figures.

A represents the induction or suction pipe through which the liquid enters the pump or ejector by which it is to be raised.

B is a cup or vessel in the form of an inverted cone, which is attached to the lower end of the induction-pipe in such manner as to close the same and prevent the liquid from flowing into the pipe without first entering the cup. Perforations C C are made through the sides of the pipe inside and near the bottom of the cup, through which, and only through which, the liquid can enter the induction-pipe. The cup is covered by a strainer or perforated cover, D, which divides or breaks up the liquid as it passes through into the cup, and facilitates and renders more certain the escape of the gas from the liquid. The liquid entering the cup through the perforated cover descends by its gravity and enters the induction-pipe through the openings C C, and upon this descending movement which the liquid is compelled to take in order to enter the induction-pipe the efficacy of the instrument depends. The specific gravity of the gas being so much less than that of the liquid, and its natural tendency being to rise up, a separation of the gas and liquid will be effected by the gas refusing to follow the downward course of the liquid. The breaking up of the current of the liquid into small streams by the perforated cover will also help to liberate the gas and facilitate its separation.

This device is specially applicable to the separation of the gas from the oil in deep petroleum-wells, in which, as is well known, the gas exists in such quantities as to seriously interfere with the action of the pumps, ejectors, or other instruments used for raising the oil from the wells.

In a former application for certain improvement in petroleum ejectors, filed on the 9th of January, 1865, (and which is now pending,) I have shown this same device in combination with the induction-pipe and ejector, only for the purpose of describing and claiming it in the combination, as there shown, having no intention or desire in that case to claim the device itself. I make this as a separate application for the device as a distinct invention of itself, without reference to any combination thereof with other devices.

Having thus described my invention, what I claim, and desire to secure by Letters Patent, is—

The application and use of the conical cup or vessel B, or equivalent device, to the induction pipe or openings of a pump, ejector, or other instrument for raising liquids from wells or reservoirs, by which a perfect separation is effected of any gas which the well may contain from the liquid being raised, and the gas thus prevented from entering said pump or ejectors, substantially as set forth.

W. R. GREENLEAF.

Witnesses:
GEO. W. WALLACE,
W. H. FORBUSH.